United States Patent [19]
Schwartz et al.

[11] 3,857,978
[45] Dec. 31, 1974

[54] SOFT DRINK STABILIZER

[75] Inventors: Haraldo Alberto Schwartz, Rio de Janeiro; Odilio Lotario Moldenhauer, E. Rio; Seymour Maurice Greenman, Rio de Janeiro-GB, all of Brazil

[73] Assignee: Concentrados Nacionais S.A., Rio de Janeiro, Brazil

[22] Filed: June 4, 1973

[21] Appl. No.: 366,587

[52] U.S. Cl. ............... 426/190, 252/356, 426/222, 426/223, 426/227, 426/321, 426/330, 426/342, 426/365, 426/366
[51] Int. Cl. ........................... A23l 1/00, A23l 3/00
[58] Field of Search .......... 426/227, 175, 190, 221, 426/222, 223, 321, 330, 342, 365, 366, 96; 252/356

[56] References Cited

UNITED STATES PATENTS

| | | | |
|---|---|---|---|
| 2,422,145 | 6/1947 | Taylor | 426/223 |
| 2,868,646 | 1/1959 | Schapiro | 426/96 |
| 3,181,953 | 5/1965 | Van Ness | 426/190 X |
| 3,181,954 | 5/1965 | Inoue et al. | 426/222 |
| 3,245,798 | 4/1966 | Van Ness | 426/96 |
| 3,353,961 | 11/1967 | Simon | 426/366 X |

*Primary Examiner*—S. Leon Bashore
*Assistant Examiner*—Arthur L. Corbin
*Attorney, Agent, or Firm*—Robert W. Fiddler

[57] ABSTRACT

A combined abietic acid-fumeric acid ester of pentaerythritol is used as a stabilizing agent for soft drink products which contain essential oil flavoring.

7 Claims, No Drawings

SOFT DRINK STABILIZER

BACKGROUND OF THE INVENTION

Essential oil flavored soft drinks are prepared by first emulsifying the flavoring oils and water with gum arabic, and adding coloring matter and preservative to produce a flavor concentrate. The flavor concentrate is then combined with sugar syrup and citric acid to form a flavored syrup, which in turn is mixed with water, carbonated or not, for the final ready-to-be-packaged drink.

The emulsion of essential oil, water and gum arabic forming the flavor concentrate must be stabilized to prevent the separation of oil and the resultant ring or scum formation at the top of the packaged drink, and additionally to maintain the desired cloudy appearance characteristic of a stable emulsion.

In recent years, various brominated vegetable oils have been used as stabilizers for soft drinks, functioning by blending with the essential oils to give the combined oil fraction a specific gravity equal to that of the aqueous fraction of the final drink emulsion. Because of suspected undesirable physiological effects, however, these brominated compounds are now being discarded, and their use in food products is being prohibited.

The search for a satisfactory non-toxic substitute for the brominated vegetable oils as a soft drink stabilizer has resulted in the present invention.

SUMMARY OF THE INVENTION

The combined abietic acid-fumaric acid ester of pentaerythritol, when manufactured and employed in formulations as are hereinafter described, has proved to be a most efficient stabilizer for soft drink products. Comparison with the compounds disclosed in U.S. Pat. No. 3,353,961 of Nov. 21, 1967 shows the markedly superior stabilizing effect of the combined ester of this invention. Comparison with the brominated oils heretofore used for this purpose has established that the pentaerythritol abietate-fumarate ester provides at least equivalent ring-free stability to flavored soft drinks, and further disperses and emulsifies even more readily, and is much more tolerant of changes in the sugar concentration (Brix) of the final drink composition to provide what is referred to in the trade as a "cleaner" flavor in the final drink.

This invention therefore offers an eminently suitable stabilizer for soft drink formulations containing essential oils, most commonly citrus oils, or fractions thereof. It is noteworthy that the stabilizing effectiveness of the combined ester here described and claimed is quite specific, since neither pentaerythritol abietate ester nor pentaerythritol fumerate ester alone has significant stabilizing qualities, and altering the fumaric acid content of the combined ester by as little as 5 percent up or down, destroys its ability to hold the soft drink emulsion together.

A feature of the invention resides in the fact that desired stabilization of flavored soft drinks is accomplished without the use of brominated compounds suspected of toxicity.

Another feature of the invention resides in the elimination of the need to measure particle size.

Details of the composition and manufacture of the pentaerythritol abietate-fumarate ester employed in this invention, as well as illustrative examples of soft drink formulations incorporating it, are set forth below in clear, concise and exact terms.

MANUFACTURE OF THE STABILIZER

The preferred method of manufacture of the combined ester proceeds as follows:

1. 3,700 grams of distilled tall oil rosin (such as Primarex 80, manufactured by the Glidden Co.) is charged into a rosin flask under a blanket of inert gas (carbon dioxide, nitrogin, or the like). The temperature of the heating bath is raised to, and maintained at 165°–170° C. until the rosin melts;
2. 250 grams of fumaric acid is added gradually over a 45 minute period, holding the temperature at 165°–170° C.;
3. The temperature of the mass is gradually raised over a one hour period to 210° C.;
4. 585 grams of pentaerythritol is slowly added, preferably over a period of 90 minutes, keeping foaming to a minimum;
5. The temperature is again gradually raised, preferably over a period of three hours, to 270° C., at which point the inert gas flow is increased to 3 cu. m. per min.;
6. The reaction mass is maintained at this 270° C. temperature until a sample shows the following characteristics:

| | |
|---|---|
| Melting point (capillary tube) | 108–118 deg. C. |
| Acid Index | 15/20 |
| Viscosity (1/1 in toluol, 20 deg. C.) | 37/43 cps. |

The resulting product is the combined ester of this invention, which may be incorporated in soft drink formulations as illustrated by the following examples. It is obvious that while these examples describe the preparation of orange drinks, the orange flavoring is given by way of example and the concentrate formulation may be employed substituting a variety of flavorings based on synthetic and semi-synthetic flavors, other fruits, and/or fantasy flavors.

In a preferred composition the stabilizing agent will be present in the soft drink concentrate in an amount of from 2 to 5 percent and in the final drink in an amount of from 0.03 to 0.05 percent.

EXAMPLE I

A. flavor Concentrate

1. Composition (in parts by weight):

| | |
|---|---|
| Water | 66.34 |
| Gum Arabic | 18.71 |
| Sodium Benzoate | 0.15 |
| Coloring Matter | 4.74 |
| Essential Oil of Orange (twofold) | 6.06 |
| Essential Oil of Tangerine (twofold) | 0.50 |
| Pentaerythritol Ester of Abietic Fumaric Acids | 3.50 |
| | 100.00 |

2. PREPARATION a. Dissolve the gum arabic and the sodium benzoate in the water at a temperature of 75°–80° C. Remove impurities by pressure filtration or decantation;

b. Dissolve the coloring matter in the above gum preservative solution at 70° C.;

c. Dissolve the pentaerythritol combined ester in the cold citrus essential oils by means of constant agitation;

d. With constant agitation, add the ester essential oil solution to the gum solution and pass the resulting mixture through a blender or homogenizer such as a Cherry Burrel homogenizer at a pressure of 1,500 square pounds per inch.

It is to be noted that, in contrast to this simple emulsification procedure, compositions using brominated oils require homogenization at critical pressures to produce a stable emulsion, and that those revealed in U.S. Pat. No. 3,353,961 require two to four passes through the homogenizer. Further, it becomes possible to eliminate the need for particle size measurement and control as required in using brominated oils.

B. Flavored Syrup
Mix (in parts by volume):

| | |
|---|---|
| Simple Syrup 32 deg. Be | 98.05 |
| 50% Citric Acid Solution | 1.35 |
| Flavor Concentrate From A | 0.60 |
| | 100.00 |

C. Finished Orange Drink
Mix (in parts by volume):

| | |
|---|---|
| Flavored Syrup from B | 18.0 |
| Carbonated Water | 82.0 |
| | 100.0 |

The resulting soft drink, when packaged, has a stable cloud and will neither "ring" nor precipitate. The presence of the combined ester as stabilizer has absolutely no adverse effect on the taste, odor, or appearance of the drink.

EXAMPLE II

A. Flavor Concentrate
1. Composition (in parts by weight):

| | |
|---|---|
| Water | 65.688 |
| Gum Arabic | 20.000 |
| Sodium Benzoate | 0.150 |
| Coloring Matter | 2.362 |
| Synthetic Orange Oil (Florida type) | 5.400 |
| Synthetic Orange Oil (California type) | 2.900 |
| Pentaerythritol Ester of Abietic Fumaric Acids | 3.500 |
| | 100.000 |

The preparation steps employed in preparing the flavor concentrate of this Example II are identical to those set forth for Example I.

B. Flavored Syrup
Mix (in parts by volume):

| | |
|---|---|
| Simple Syrup 32 deg. Be | 97.90 |
| 50% Citric Acid Solution | 1.60 |
| Flavor Concentrate From A | 0.50 |
| | 100.00 |

As in Example I, this composition provides a stable ring-free product when packaged.

The above disclosure has been given by way of illustration and elucidation, and not by way of limitation, and it is understood that the invention may be embodied in a variety of forms within the scope of the appended claims.

What is claimed is:

1. A stabilizing agent for flavoring oil containing soft drink products comprising the combined abietic acid-fumaric acid ester of pentaerythritol.

2. The stabilizing agent of claim 1, when compounded in the proportions by weight of:
3,700 parts distilled tall oil rosin containing abietic acid; not less than 240 nor more than 260 parts fumaric acid; and 585 parts pentaerythritol.

3. The stabilizing agent of claim 2, when prepared according to the method which comprises:
heating the tall oil rosin to 165°–170° C. under a blanket of inert gas until said rosin is melted;
gradually adding fumaric acid, maintaining temperature at 165°–170° C.; slowly raising the temperature to 210° C.;
adding pentaerythritol gradually; and raising the temperature to 270° C. and holding said temperature until the product shows a melting point of 108°–118° C. (capillary method) and an acid index of 15/20.

4. The stabilizing agent of claim 1, when dispersed in a soft drink flavor concentrate which further comprises water, gum arabic and flavoring essential oils.

5. The stabilizing agent of claim 4, when present in said soft drink concentrate in an amount of from 2 to 5 percent.

6. The stabilizing agent of claim 1, when present in a soft drink flavor syrup which further comprises water, gum arabic, flavoring essential oils, and sugar.

7. The stabilizing agent of claim 1, when present in a packaged soft drink in an amount of from 0.03 to 0.05 percent.

* * * * *